US005204574A

United States Patent [19]

Kanno et al.

[11] Patent Number: 5,204,574

[45] Date of Patent: Apr. 20, 1993

[54] COMMUTATOR FOR A MOTOR AND METHOD OF MANUFACTURING THE SAME

[75] Inventors: Kazunobu Kanno; Kouji Takahashi, both of Toyohashi, Japan

[73] Assignee: ASMO Co., Ltd., Kosai, Japan

[21] Appl. No.: 799,109

[22] Filed: Nov. 27, 1991

[30] Foreign Application Priority Data

Nov. 30, 1990 [JP] Japan ........................ 2-337582
Sep. 26, 1991 [JP] Japan ........................ 3-247428

[51] Int. Cl.[5] .............................. H02K 13/00

[52] U.S. Cl. ..................... 310/233; 310/235; 310/236

[58] Field of Search ............ 310/233, 234, 235, 236, 310/237, 219, 232, 42, 43; 29/597

[56] References Cited

U.S. PATENT DOCUMENTS 2,945,971 7/1960 Apostoleris ..................... 310/234
3,140,414 7/1964 Skj dt et al. .................. 310/235
3,492,519 1/1970 Kirkwood ....................... 310/235
4,872,255 10/1989 Kogej .......................... 310/235
4,920,633 5/1990 Wojcik ......................... 29/597

FOREIGN PATENT DOCUMENTS 1214538 4/1960 France ......................... 29/597
0595610 7/1959 Italy .......................... 310/235
0254946 10/1990 Japan .......................... 310/235

*Primary Examiner*—R. Skudy
*Attorney, Agent, or Firm*—Burns, Doane, Swecker & Mathis

[57] ABSTRACT

Four side walls surrounding a recess in the center of a commutator segment are extended to overhang toward the recess comprising claws and cut-and-raised protrusions, thereby ensuring that the commutator segment is securely engaged with the resin filled in the recess against any of the triaxial stresses due to centrifugal force, rotating force, and tensile force. The volume of cutting in the insulating resin at undercut portions is reduced. The internal and cut-and-raised protrusions are molded by cylindrically bending oriented progressive dies made of plate material.

4 Claims, 15 Drawing Sheets

COMMUTATOR FOR A MOTOR AND METHOD OF MANUFACTURING THE SAME

FIELD OF THE INVENTION

1. Field of the Invention

The present invention relates to a commutator for use in a miniature motor and a method of manufacturing the same. It is designed, in particular, to improve the construction of internal claws for holding an insulating resin which is provided on the inner circumferential side of the commutator so as to prevent commutator segments from scattering away from the insulating resin portion adhered to the inner circumferential face during rotation of the motor and further to improve the strength of the insulating resin portion by reducing the amount of undercuts for insulating each commutator segment.

2. Description of the Prior Art

This type of commutator for use in a miniature motor is conventionally constructed as shown in FIG. 1. On the outer circumferential face of a cylindrical insulating resin portion 1 for mounting a motor shaft in the shaft center, a plurality of commutator segments 2 are fixed under condition of being isolated from each other by providing a plurality of undercuts 3 therebetween. The commutator is fabricated by forming a cylindrical tube made of some conductive material, thereafter filling an insulating resin inside the tube so as to adhere thereto, and thereafter providing undercuts on the inner face of the cylindrical tube with a space in the circumferential direction.

In a miniature motor containing such a conventional commutator, the commutator segments 2 are subjected to centrifugal force, rotating force, and tensile force during rotation, so that the commutator segments may be separated and scattered from the insulating resin portion 1 fixed thereto.

In order to prevent the separation of the commutator segments 2, it is conventionally practiced that internal claws 5A, 5B and 5C for holding the insulating resin as shown in FIGS. 2, 3 and 4 are protrusively provided on the inner circumferential faces of the commutator segments 2. More specifically, the internal claws 5A as shown in FIG. 2 are formed on the inner circumferential face of the cylindrical tube made of a conductive material by cutting and raising them spaced in the circumferential direction. The internal claws 5B as shown in FIG. 3 are formed in such a way that protrusions serving as internal claws are previously molded to both ends of a flat plate made of a conductive material with a space, and after the plate is shaped into a cylindrical form, it is bent so as to protrude inwardly toward the cylindrical tube. The internal claws 5C as shown in FIG. 4 are formed of rolled protrusions made by rolling a flat plate made of a conductive material to make protrusions in the longitudinal direction as illustrated. Thus, the internal claws 5A and 5B are provided to the inner circumferential face of the cylindrical tube spaced in the circumferential direction, while the internal claws 5C are provided on the entire circumference of the tube.

However, in providing the cut-and-raised internal claws 5A as shown in FIG. 2, a large number of manufacturing steps are involved due to the processes of cutting and raising the claws after bending the cylindrical tube. Also, in providing the bent internal claws 5B as shown in FIG. 3, a larger volume of the insulating resin is needed to ensure adequate strength against the separation, however this provides a disadvantage in that the inner and outer dimensions of the commutator are restricted for its design. Further, in providing the internal claws 5C formed of rolled protrusions as shown in FIG. 4, a rolling process is involved, which disadvantageously causes higher costs for facilities. Moreover, in providing undercuts to the commutator after filling the insulating resin in the cylindrical tube, it is required to deeply cut the resin portion since the internal claws 5C are provided on the entire circumference, resulting in reduced strength of the insulating resin portion and accelerated abrasion of the undercutting tools.

In addition, in conventional commutators having internal claws 5A, 5B or 5C, there has been a problem that there tends to be deformation or defect in the filling process of the insulating resin due to the pressure used for molding the insulating resin.

SUMMARY OF THE INVENTION

It is, therefore, an object of the present invention to provide a commutator and a method of manufacturing the same for enabling the internal claws for holding an insulating resin to be simply fabricated without involving any large number of processes or manufacturing steps nor requiring any expensive facilities such as rolling equipment, which includes internal claws free from deformation due to pressure for molding insulating resin as in the conventional internal claws, and yet claws according to the present invention have such strength against separation to securely holding the insulating resin more positively than conventional internal claws. Another object of the present invention is to improve the strength of the insulating resin portion by decreasing the depth of the undercut which is carried out after filling the insulating resin.

In order to achieve the above-mentioned objects, according to a feature of the present invention, provided is a commutator in which a plurality of commutator segments are arranged alternately with undercuts adhesively fixed onto the outer circumferential face of a cylindrical insulating resin portion, comprising:

a rectangular recess provided in the center portion of the inner circumferential face on the side of the adhesion of the insulating resin in each commutator segment; and internal claws and cut-and-raised protrusions provided to the four sides surrounding the entire periphery of the recess so as to be slanted inwardly until the claws overhang above the recess.

Preferably, to each commutator there are provided a V-shaped groove, an outwardly slanted internal claw, and a deep-bottomed groove, respectively, on the outer side of the internal claws in the peripheral direction on both sides of the recess, where the undercuts are preferably provided in the center of the deep-bottomed groove.

According another feature of the present invention, provided is a method of manufacturing a commutator, comprising the steps of:

forming grooves smaller in width and recesses larger in width alternately on one face of a thin-wall, strip-shaped flat plate made of a conductive material;

thereafter forming two pieces of protrusions between the groove and the recess by cutting open a ridge portion between the groove and the recess into V-shape;

providing internal claws with the two pieces of protrusions slanted toward the recess and the groove respectively by extending the cut-open portion of V shape;

providing a cut-and-raised protrusion slanted toward the recess to both of the edge portions of the recess along the axis direction thereof;

thereafter forming a cylindrical tube by cylindrically bending a flat plate;

subsequently filling an insulating resin in the cylindrical tube to be adhered thereto; and thereafter providing undercuts by cutting in the cylindrical tube along the center portion of the groove thereof.

According to still another feature of the present invention, provided is a commutator for a miniature motor having a plurality of commutator segments fixed on the outer circumferential face of a cylindrical insulating resin portion alternately with undercuts, comprising:

a recess defined in the center on the inner circumferential face of each commutator segment to be adhesively fixed to the outer face of the insulating resin; a center convex portion in the center of the recess; an end convex portion on one side of the recess; cut-and-raised protrusions provided at both axial ends of the center convex portion so as to be slanted outwardly so that they overhang the recess; cut-and-raised protrusions provided at the inner end of the end convex portion so as to be slanted inwardly to overhang the recess; and internal claws and grooves provided on both sides in the peripheral direction of the recess along the entire length in the axial direction so as to be slanted inwardly, wherein the undercuts are provided in the center of the recess.

According to further another feature of the present invention, provided is a method of manufacturing a commutator, comprising the steps of:

forming smaller-in-width grooves and recesses having end convex and center convex portions alternately on one face of a thin-wall, strip-shaped and flat plate made of a conductive material;

thereafter providing internal claws slanted inwardly in the circumferential direction by extending the groove, while providing cut-and-raised protrusions slanted toward the recess at both the axial ends and at the inner end of the end convex portion;

thereafter forming a cylindrical tube by cylindrically bending the flat plate;

subsequently filling an insulating resin inside the cylindrical tube so as to be adhesively fixed thereto; and thereafter providing undercuts by cutting in the cylindrical tube along the center portion of the groove thereof.

As described above, the commutator segments are provided with the internal claws and cut-and-raised protrusions which are so arranged that the claws and protrusions overhang the recess in a way of surrounding over the entire periphery thereof, or that they overhang the center convex portion so as to surround the periphery thereof, whereby the commutator segments are ensured to be engaged with the insulating resin filled in the recess against any one of centrifugal force, rotating force, and tensile force which will occur during the rotation of the commutator. As a result, the strength of the commutator segments against separation from the insulating resin are enhanced, thus preventing them from being scattered. In addition, the commutator segments can be prevented from floating due to a high level of heat generated in wiring, by forming strong cut-and-raised protrusions opposed to each other in proximity to the connecting claw.

In addition, with provision of undercuts by cutting in along the deep-cut groove in the axial direction, the degree of the undercuts can be reduced, thereby enhancing the strength of the insulating resin.

Furthermore, the cylindrical tube serving as commutator segments is simply formed by cylindrically bending a plate after effecting a process for forming a recess and for forming a cut-and-raised member on its one face, therefor allowing the commutator segments to be manufactured with progressive-dies at high productivity.

BRIEF DESCRIPTION OF THE DRAWINGS

These and other objects and features of the present invention will become apparent from the following description taken in conjunction with the preferred embodiments thereof with reference to the accompanying drawings, and wherein:

FIGS. 5 to 20 are diagrams for showing a commutator of a first embodiment according to the present invention, wherein FIG. 5 is a partially broken perspective view of the commutator;

FIG. 6 is a partially enlarged sectional view of FIG. 5;

FIG. 7 is a perspective view of commutator segments;

FIG. 8 is a sectional view taken along a line A—A in FIG. 7;

FIG. 9 is a sectional view taken along a line B—B in FIG. 7;

FIG. 10 is a perspective view of a flat plate for forming commutator segments;

FIG. 11 is a perspective view of the first process of manufacturing commutator segments;

FIG. 12 is a sectional view of FIG. 11;

FIG. 13 is a perspective view of the second process of manufacturing the commutator segments;

FIG. 14 is a sectional view of FIG. 13;

FIG. 15 is a perspective view of the third process of manufacturing the commutator segments;

FIG. 16 is a sectional view of FIG. 15;

FIG. 17 is a perspective view of the fourth process of manufacturing the commutator segments;

FIG. 18 is a sectional view of FIG. 15;

FIG. 19 is a perspective view of the fifth process of manufacturing the commutator segments; and FIG. 20 is a sectional view of FIG. 17.

FIGS. 21 to 38 show a second embodiment of a commutator according to the present invention, wherein FIG. 21 is a partially broken perspective view of commutator segment;

FIG. 22 is a perspective view of the commutator segment;

FIG. 23 is a sectional view taken along the line C—C in FIG. 22;

FIG. 24 is a sectional view taken along the line D—D in FIG. 22;

FIG. 25 is a perspective view showing a flat plate serving as commutator segments;

FIG. 26 is a perspective view showing the first manufacturing process of commutator segments;

FIG. 27 is a transverse sectional view of FIG. 26;

FIG. 28 is a longitudinal sectional view of FIG. 26;

FIG. 29 is a perspective view showing the second manufacturing process of the commutator segments;

FIG. 30 is a transverse sectional view of FIG. 29;

FIG. 31 is a longitudinal sectional view of FIG. 29;

FIG. 32 is a perspective view showing the third manufacturing process of the commutator segments;

FIG. 33 is a transverse sectional view of FIG. 32;

FIG. 34 is a longitudinal sectional view of FIG. 32;

FIG. 35 is a perspective view of the third manufacturing process of the commutator segments;

FIG. 36 is a sectional view of FIG. 35;

FIG. 37 is a perspective view of the fourth manufacturing process of the commutator segments; and FIG. 38 is a sectional view of FIG. 35.

DETAILED DESCRIPTION OF THE PREFERRED EMBODIMENT

Figure 1:
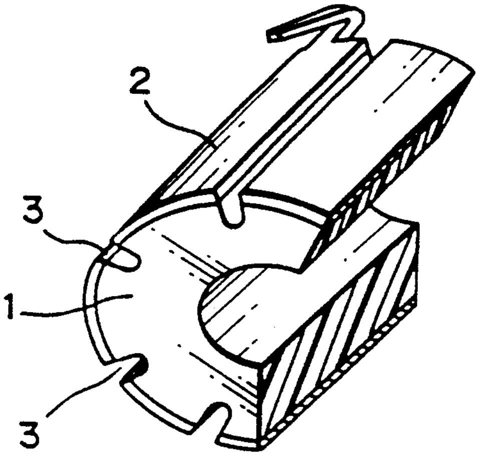
Fig. 1 (Prior Art)
FIG. 1 is a partially broken perspective view of a conventional commutator.
Figure 2:
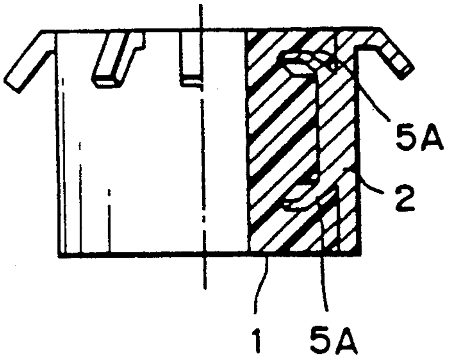
Fig. 2 (Prior Art)
FIG. 2 is a partially broken side view showing internal claws of a conventional commutator.
Figure 3:
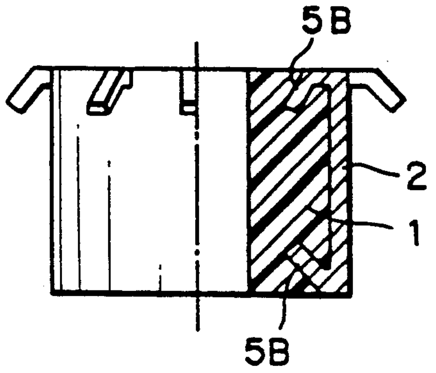
Fig. 3 (Prior Art)
FIG. 3 is a partially broken side view showing internal claws of another conventional commutator.
Figure 4:
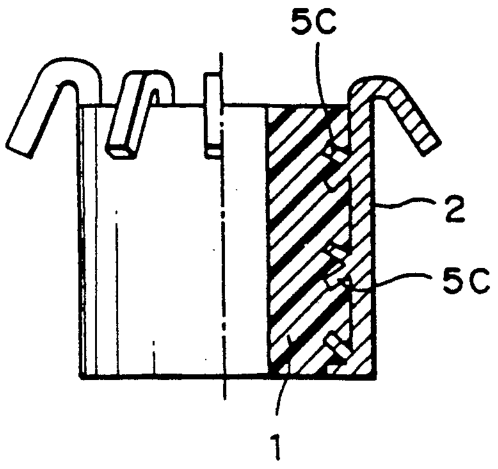
Fig. 4 (Prior Art)
FIG. 4 is a partially broken side view showing internal claws of further another conventional commutator.
Figure 5:
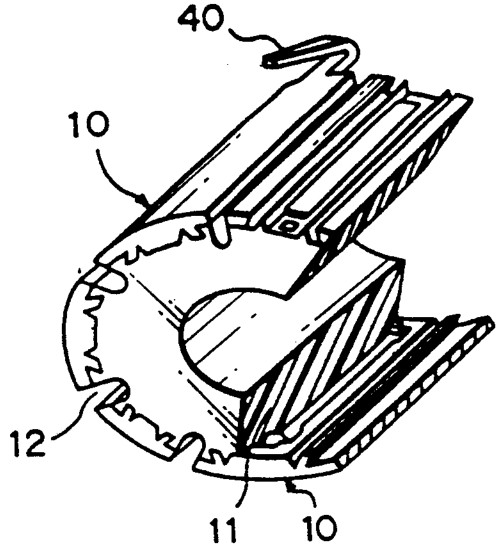
Figure 6:
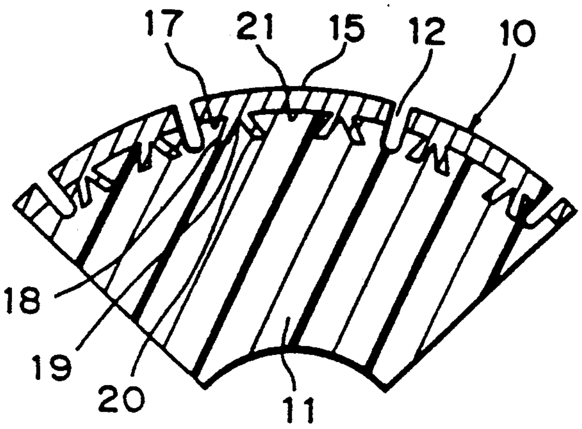

A first preferred embodiment of the present invention is described in more detail hereinbelow with reference to FIGS. 5 to 20. In FIGS. 5 and 6, indicated by reference numeral 10 is a commutator segment made of a conductive material; by numeral 11 is an insulating resin portion of cylindrical shape; by numeral 12 is an undercut which is formed by cutting in at constant intervals in a circumferential direction inwardly from the outer face of the commutator segment 10 into the insulating resin portion 11. A plurality of commutator segments 10 are adhesively fixed onto the outer circumferential face of the insulating resin portion 11 alternately with the undercuts 12. Reference numerals 17, 18, 19, and 20 in FIG. 6 each denote one of the more specific pairs of deep bottomed grooves 17A, 17B, outer internal clause 18A, 18B, V-shaped grooves 19A, 19B, inner internal grooves 20A, and 20B illustrated in FIGS. 7 and 8 and described in more detail below.

Figure 7:
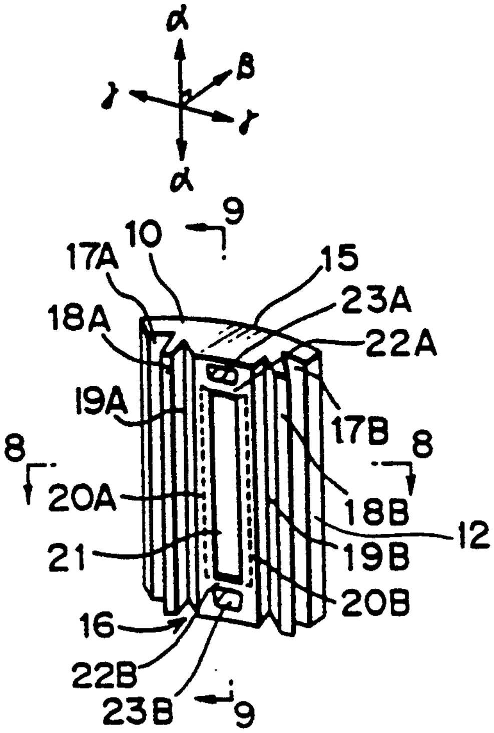
Figure 8:
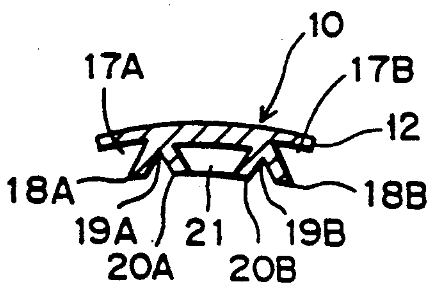
Figure 9:
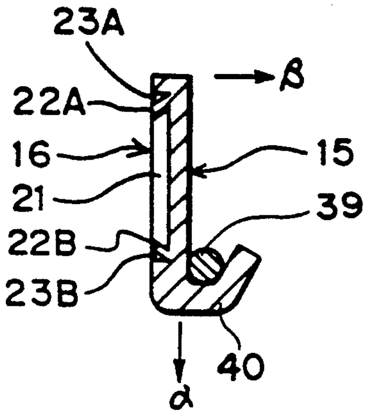

Each commutator segment 10 is of such a shape as illustrated in FIGS. 7 to 9, wherein the outer circumferential face 15 thereof is a circular arc face, and on the inner circumferential face 16 thereof, there are formed grooves, inwardly protruded internal claws for holding the insulating resin, and the like in the circumferential direction of the wall. More specifically, the commutator segment 10 has:

extremely small-in-width rectangular deep-bottomed grooves 17A and 17B at both its ends in the circumferential direction;

outer internal claws 18A and 18B protruded inwardly from the inner ends of the grooves 17A and 17B and slanted toward the bottom of the undercut 12;

V-shaped grooves 19A and 19B defined in the center of the outer internal claws 18A and 18B;

inner internal claws 20A and 20B provided which form the inside walls of the grooves 19A and 19B so as to be inwardly protruded inwardly and slanted close to each other; and large-in width rectangular shallow recess 21 defined inside the inner internal claws 20A and 20B.

The commutator segment 10 has the grooves and claws formed thereon over its entire axial length except only the recess 21 which is formed in the center of the segment 10 and spaced from the upper and lower ends of the segment 10. Between the upper and lower ends of segment 10 and the recess 21 there are provided cut-and-raised protrusions 22A and 22B slanted toward above the recess 21 along the top and bottom sides thereof, i.e., in the circumferential direction. Thus, there are defined V-shaped grooves 23A and 23B between the cut-and-raised protrusions 22A, 22B and the top and bottom ends of the segment 10 respectively.

The inner face of the commutator segment 10 having grooves, recesses, internal claws, and cut-and raised protrusions formed thereon is fixed adhesively to the outer face of the cylindrical insulating resin portion 11 with the undercuts 12 opened in such a manner that the grooves 17A and 17B at both ends in the circumferential direction confront the undercuts 12. The insulating resin filled in the recess 21 defined in the center portion of the inner circumferential face of the commutator segment 10 is surrounded by the inner internal claws 20A and 20B protruded inwardly from the circumferential both ends thereof and by the cut-and-raised protrusions 22A and 22B protruded inwardly from the both top and bottom ends of the recess 21.

Accordingly, four side walls overhang the recess 21 inwardly, thereby ensuring that the insulating resin filled in the recess 21 is effectively engaged therewith. This arrangement ensures that the commutator segment 10 is effectively engaged with the insulating resin portion 11 in the triaxial directions, as shown in FIGS. 7 to 9, by providing four side walls, i.e., by the inner internal claws 20A, 20B and the cut-and-raised protrusions 22A, 22B against the centrifugal force $\beta$ involved in the rotation of the motor, by the inner internal claws 20A, 20B against rotating force $\gamma$, and by the cut-and-raised protrusions 22A, 22B against the tensile force $\alpha$.

Moreover, the commutator segments 10 adjoining with an undercut 12 interposed therebetween overhang the insulating resin filled in the groves 17A and 17B by means of the outer internal claws 18A and 18B. Thus, the insulating resin portion 11 confronting the undercut 12 is also securely engaged with the outer internal claws 18A and 18B against the rotating force $\gamma$.

Next, the method of manufacturing the commutator of the above embodiment is described below with reference to FIGS. 10 to 20.

Figure 10:
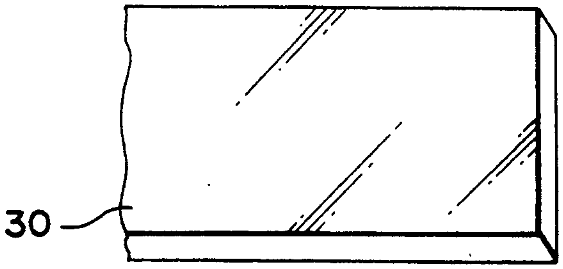
Figure 11:
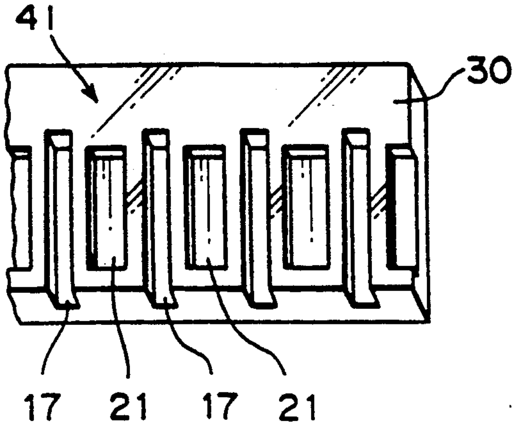
Figure 12:
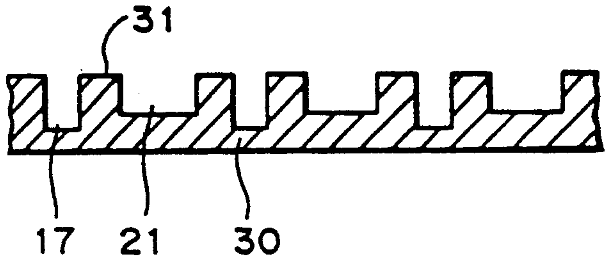

Using a thin-wall strip-shaped and flat plate 30 made of a conductive material as shown in FIG. 10, on its one face and from its one end (the lower end in the figure) there are molded alternately rectangular grooves 17 small in width and recesses 21 larger in width but shorter in length than the grooves 17 as shown in FIGS. 11 and 12. The recesses 21 are shallower in depth than the grooves 17 and are molded with a specified interval apart from both ends of the plate 30, while the grooves 17 are molded by cutting in in the plate from the one end of the plate 30. Both the grooves 17 and the recesses 21 are spaced from the other end (the top end in the figure), thereby allowing a punching portion 41 for a bent flange portion to remain. The molding is performed in such a way that a plurality of grooves and recesses are formed by one-time press working.

Figure 13:
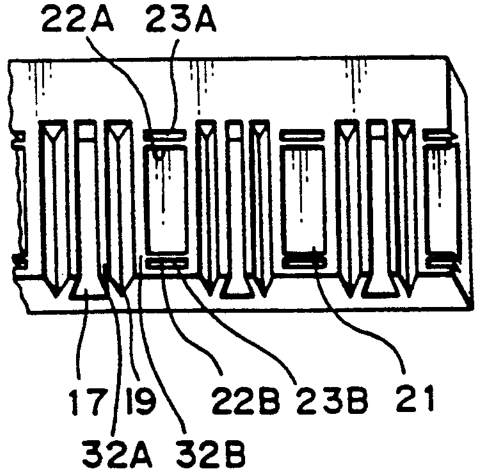
Figure 14:
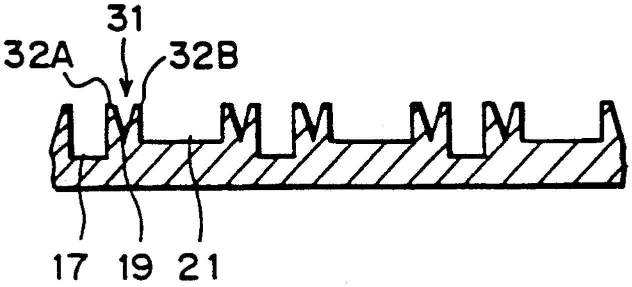

Referring now to FIGS. 13 and 14, a pair of projecting portions 32A and 32B are formed defining a V-shaped groove 19 interposed between the groove 17 and the recess 21 by cutting open a ridge portion 31 located between the groove 17 and the recess 21 into a V shape using a wedge (not shown). In the present embodiment, the angle of the V-shaped groove 19 is approximately 30 degrees. On both upper and lower sides of the recess 21 there are further provided cut-and-raised protrusions 22A and 22B directed inward (toward the recess 21). These cut-and-raised protrusions 22A and 22B are formed by providing V-shaped grooves 23A and 23B just above and below the outside thereof, respectively.

Figure 15:
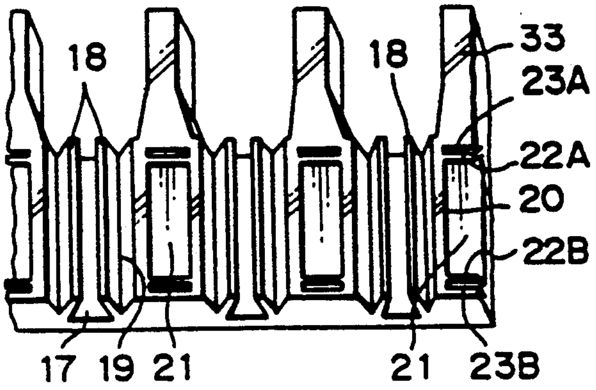
Figure 16:
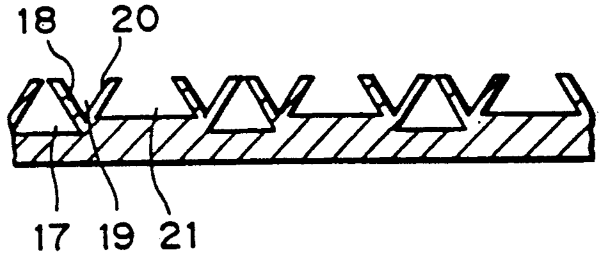

Referring next to FIGS. 15 and 16, the groove 19 cut open by the wedge (to an angle of approximately 90 degrees in this embodiment) is extended in such a manner that the projecting members 32A and 32B on both sides of the groove 19 are slanted to be apart from each other to overhang the groove 17 by the projecting member 32A and to overhang the recess 21 by the projecting member 32B, whereby the outer internal claws 18 and the inner internal claws 20 are formed. Thereafter, the upper side of the flat plate 30 is punched into a required shape, as illustrated in the figure, thus forming projecting portions 33 serving as connecting claws.

Thereafter, the flat plate 30 is subjected to a cutting process for cutting the flat plate into a plurality of commutator plate units each having a predetermined length corresponding to a size of a unit commutator plate. That is, the thin-wall strip-shaped flat plate 30 made of a conductive material is composed of a plurality of commutator units sequentially continued, and the commutator units are sequentially conveyed to be formed by a pressing process. By cutting the flat plate into a predetermined size, each of the cut plates corresponds to a unit of a commutator composed of a plurality of commutator segments sequentially continued.

Figure 17:
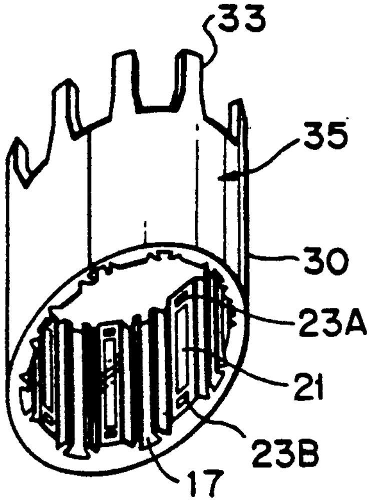
Figure 18:
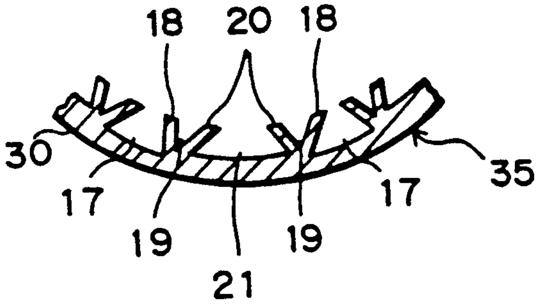

Referring next to FIGS. 17 and 18, the flat plate 30 is subjected to a cylindrically bending process with its both sides adhesively jointed so as to form a cylindrical tube 35 having grooves 17, 19, 23A, 23B and internal claws 18 and 20, recesses 21, and cut-and-raised protrusions 22A and 22B formed on its inner circumferential face. The processes from the molding of the grooves and recesses to the cylindrical bending are carried out by press working.

Figure 19:
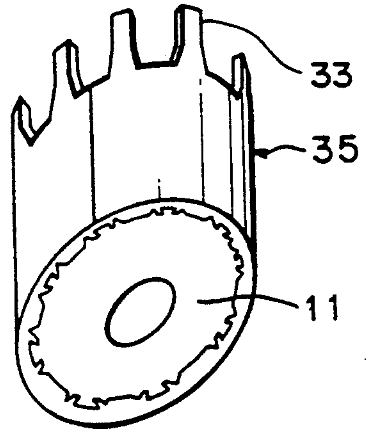
Figure 20:
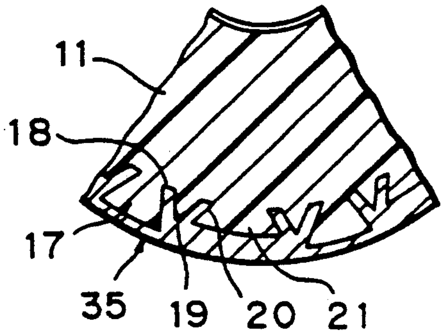

Referring next to FIGS. 19 and 20, an insulating resin is filled in the cylindrical tube 35, thereby forming the cylindrical insulating resin portion 11 to which the cylindrical tube 35 is fixed adhesively on its outer circumferential face. The inner diameter of the insulating resin portion 11 is set to a value corresponding to the outer diameter of a motor shaft to be inserted thereinto.

Finally, the center portion of the groove 17 in the cylindrical tube 35 is undercut from its outer circumferential face to form an undercut 12, thereby separating the cylindrical tube 35 into a plurality of commutator segments 10. Also, projecting portions 33 are subjected to a bending process so as to form connecting claws 40 (see FIG. 5). Each connecting claw 40 is coupled with a winding 39 (see FIG. 9).

Through the processes mentioned above, there can be manufactured a commutator having a number of commutator segments 10 separated by undercuts 12 and fixed adhesively to the outer circumferential face of the insulating resin portion 11 as shown in FIGS. 5 and 6.

Figure 21:
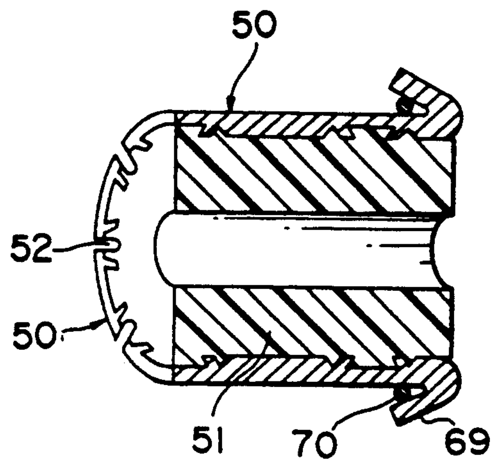

FIGS. 21 through 38 pertain to a second preferred embodiment for a commutator according to the present invention. In FIG. 21, indicated by reference numeral 50 is a commutator segment; by numeral 51 is a cylindrical insulating resin; by numeral 52 is an undercut cut in the commutator segment 50 from the outer circumferential face to the insulating resin portion 51 at constant intervals in the circumferential direction. A plurality of commutator segments 50 are arranged alternately with the undercuts 52 adhesively on the circumferential face of the insulating resin portion 51.

Figure 22:
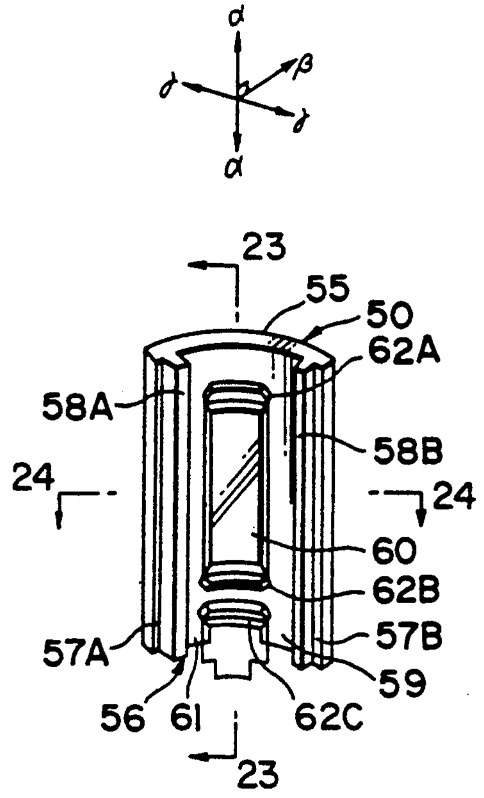
Figure 23:
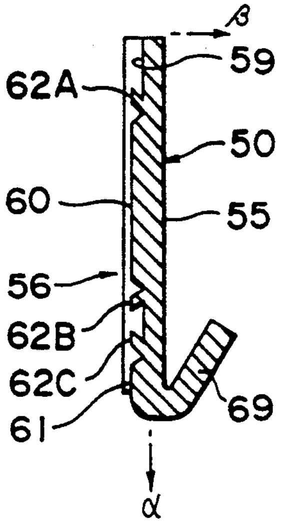
Figure 24:
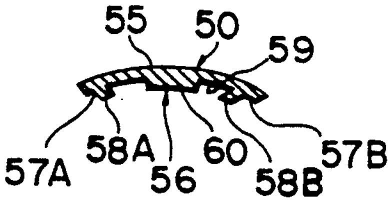

The commutator segment 50 is of such a shape as illustrated in FIGS. 22 to 24, wherein its outer circumferential face 55 is a circular arc face, and on its inner circumferential face 56 in the circumferential direction of the wall there are provided grooves, inwardly protruded internal claws for holding the insulating resin, and convex portions. More specifically, the commutator segment 50 has extremely small-in-width and rectangular grooves 57A and 57B at both its ends in the circumferential direction; outer internal claws 58A and 58B protruded inwardly and slanted from the inner ends of the grooves 57A and 57B close to each other; a recess 59 provided inside the outer internal claws 58A and 58B; a center convex portion 60 provided in the center of the recess 59; and end convex portion 61 provided on the side of one end of the recess 59; cut-and raised protrusions 62A and 62B slanted outwardly at both axial ends of the center convex portion 60; and a cut-and-raised protrusion 62C slanted inwardly at the inner end of the end convex portion 61.

The commutator segment 50 has the grooves 57A and 57B and outer claws 58A and 58B formed thereon over its entire axial length, while the recess 59 is formed with spacings for the upper end and the end convex portion 61.

The inner side of the commutator segment 50 having the grooves, internal claws, recesses, convex portions, claws and cut-and-raised protrusions formed thereon is adhesively fixed to the outer face of the cylindrical insulating resin portion 51 with the undercuts 52 opened so that the grooves 57A and 57B located at both ends in the circumferential direction confront the undercuts 52. The insulating resin filled in the recess 59 defined in the center of the inner circumferential face of the commutator segment 50 is surrounded by the outer internal claws 58A and 58B protruded inwardly from the both circumferential ends thereof and the center convex portion 60, as well as by the cut-and-raised protrusions 62A and 62B slanted outwardly from the both axial ends of the center convex portion 60 and the cut-and-raised protrusion 62C slanted inwardly from the end of the end convex portion 61.

As a result, the internal claws 58A and 58B and the cut-and-raised protrusions 62A, 62B and 62C overhang the recess 59 inwardly, thereby ensuring the insulating resin filled in the recess 59 is securely engaged therewith. By this arrangement, the commutator segment 50 is securely engaged with the insulating resin portion 51 in the triaxial directions, as shown in FIGS. 22 and 23, by five-side walls, that is, by the internal claws 58A and 58B and the cut-and-raised protrusions 62A, 62B and 62C against centrifugal force $\beta$ involved in the rotation of the motor, by the internal claws 58A and 58B against rotating force $\gamma$, and by the cut-and-raised protrusions 62A, 62B and 62C against tensile force $\alpha$.

Moreover, the commutator segments 50 adjoining with an undercut 52 interposed therebetween overhang the resin filled in the grooves 57A and 57B by means of the outer internal claws 58A and 58B. Thus, the insulating resin portion 51 confronting the undercuts 52 is also securely engaged with the outer internal claws 58A and 58B against the rotating force $\gamma$. Further, the stubborn cut-and-raised protrusions 62A and 62B which are formed in proximity to a connecting claw 69 functions to prevent the commutator segment 50 from floating due to a high level of heat generated in wiring. Yet further, as compared with the first embodiment, the second embodiment can afford a larger area for holding the insulating resin portion 51 even in a miniature or multipolar commutator having shorter width and length, thus ensuring strength against separation to a sufficient extent.

Next, the method of manufacturing the commutator of the second embodiment is described below with reference to FIGS. 25 through 38.

Figure 25:
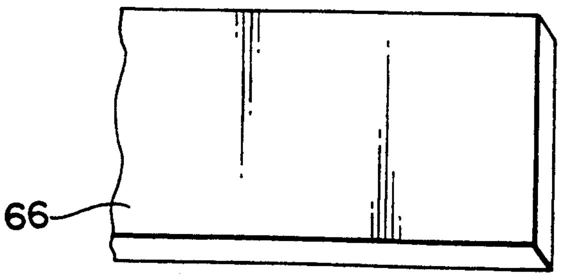
Figure 26:
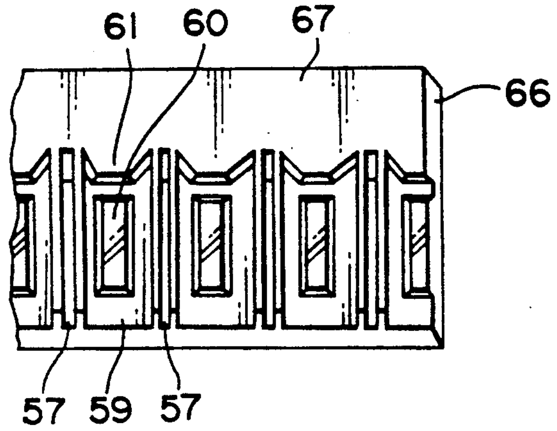
Figure 27:
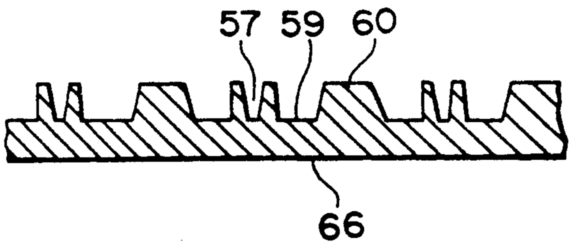
Figure 28:
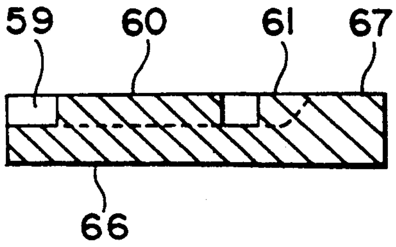

Using a thin-wall, strip-shaped and flat plate 66 made of a conductive material as shown in FIG. 25, on its one face and from its one end (the lower side in the figure), there are molded smaller-in-width rectangular grooves 57 and larger-in-width recesses 59 alternately, as shown in FIGS. 26 to 28. A rectangular center convex portion 60 is molded in the center of the recess 59 while an end convex portion 61 is molded on the side of one end of the recess 59. The recess 59 and the grooves 57 are of the same depth, and both the recess 50 and the grooves 57 are formed by cutting in the plate from the edge of one end thereof. The recess 59 and the grooves 57 are both spaced apart from the other end (the upper end in the figure), thereby allowing a punching portion 67 for a bent flange portion to be left. The molding is carried out in such a way that a plurality of grooves, recesses, and convex portions are formed by one-time press working.

Figure 29:
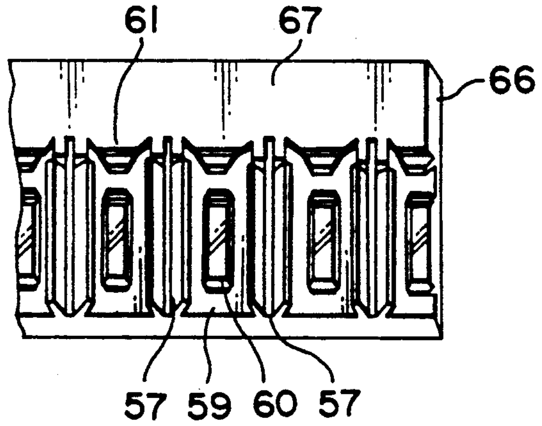
Figure 30:
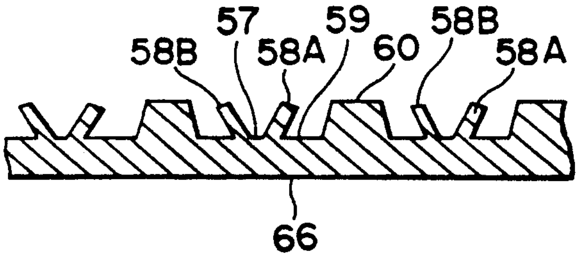
Figure 31:
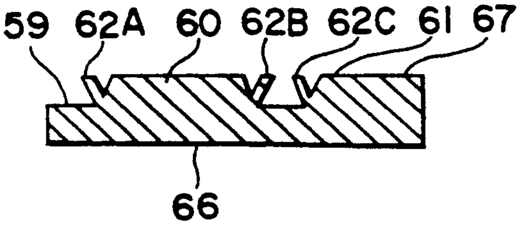
Figure 32:
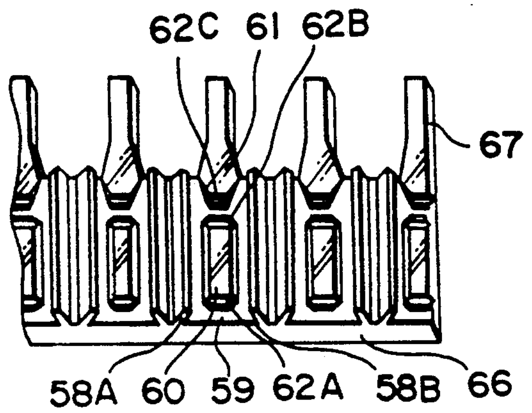
Figure 33:
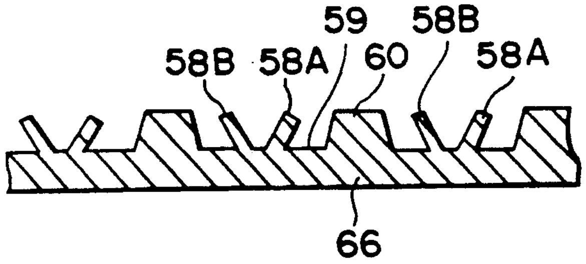
Figure 34:
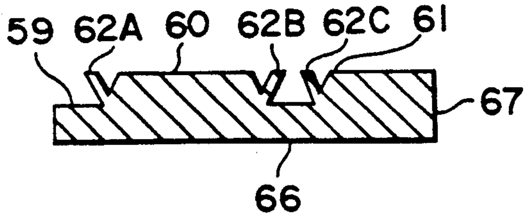

Referring now to FIGS. 29 to 31, the grooves 57 are extended (to an angle of approximately 90 degrees in this embodiment) so as to slant the internal claws 58A and 58B on both sides of the groove 57 toward such directions as apart from each other, that is, the internal claws 58A and 58B overhang the recess 59 and are slanted inwardly. Both the axial ends of the center convex portion 60 are cut and raised outwardly so as to provide cut-and-raised protrusions 62A and 62B, while the inner end of the end convex portion 61 is cut and raised inwardly to provide a cut-and-raised protrusion 62C. The cut-and-raised protrusions 62A, 62B and 62C are slanted to overhang the recess 59. Thereafter, the upper side of the flat plate 66 is punched into a required shape, as illustrated in the figure, thus forming projecting portions 67 serving as connecting claws.

Thereafter, the thin-wall, strip-shaped, flat plate 66 made of a conductive material and having a series of a plurality of commutator units is subjected to press forming with progressive dies. Through the process of cutting the flat plate into a specified length, a plurality of cut plates result in a series of commutator segments which correspond to a unit commutator.

Figure 35:
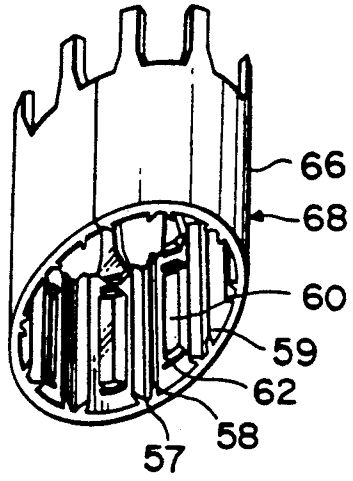
Figure 36:
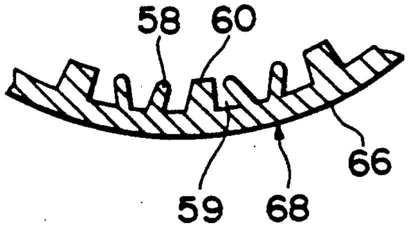

Referring next to FIGS. 35 and 36, the flat plate 66 is subjected to cylindrical bending process and its both ends are adhesively jointed, whereby a cylindrical tube 68 is prepared with grooves 57, internal claws 58, cut-and-raised protrusions 62, recesses 59, convex portions 60 and the like on its inner circumferential face. The processes from the molding of the grooves and recesses to the cylindrical bending are carried out by press working.

Figure 37:
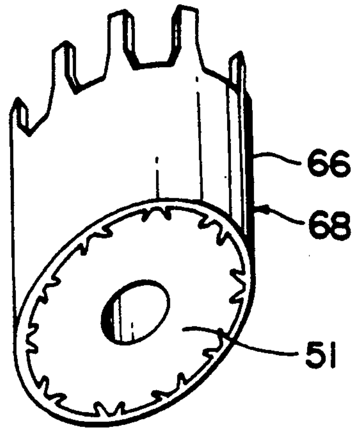
Figure 38:
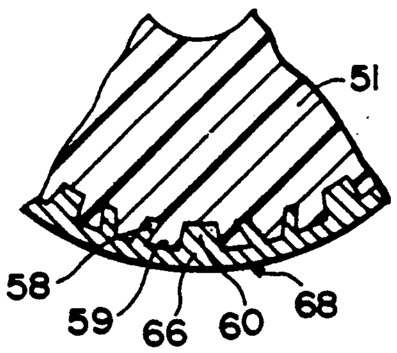

Referring next to FIGS. 37 and 38, an insulating resin is filled in the cylindrical tube 68, thereby forming the cylindrical insulating resin portion 51. The cylindrical tube 68 is fixed adhesively onto the outer circumferential face of the insulating resin portion 51. The inner diameter of the insulating resin portion 51 is set to a value corresponding to the outer diameter of the motor shaft to be inserted thereinto.

Finally, the center portion of the groove 57 of the cylindrical tube 68 is undercut from its outer circumferential face, thereby separating the cylindrical tube 68 into a plurality of commutator segments 50. Also, the projecting portions 67 are bent so as to form the connecting claws 69, each of which is coupled with a winding 70.

Through the processes mentioned above, a plurality of commutators can be manufactured having a number of commutator segments 50 separated by the undercuts 52 as shown in FIG. 21 and adhesively fixed to the outer circumferential face of the insulating resin portion 51.

As is apparent from the foregoing description, the commutator according to the present invention has advantages as listed below:

(1) Since the four side or five side walls surrounding the recess provided in the center of each commutator segment are fabricated by internal claws and cut-and-raised protrusions to overhang toward the recess, the commutator segment can be securely engaged with the insulating resin filled in the recess against any of the triaxial stresses caused by centrifugal force, rotating force and tensile force. Thus, strength of the commutator segment against the separation can be enhanced, ensuring that the commutator can be effectively prevented from separation and scattering during the rotating operation.

(2) Since the internal claws and cut-and-raised protrusions have high strength against separation even with a small size in height thereof, for example, 0.5 mm or so, therefore the internal claws and cut-and-raised protrusions can be reduced in their height. Thus:

(a) The thickness of the plate made of a conductive material to form the commutator segments can be reduced, so that the cost of the material can be reduced.

(b) Since the strength against separation of the segment can be enhanced even though the internal claws and the cut-and-raised protrusions are low in height, the amount of the insulating resin to be filled for ensuring strength can be reduced, thereby allowing as increment of the degree of freedom on designing a miniature commutator.

(c) Reduction in the height of the internal claws and cut-and-raised protrusions makes it possible to solve the problems involved in processing such as deformation or defect of the internal claws and cut-and-raised protrusions due to the pressure when molding the resin.

(3) Since the undercuts are provided to the cylindrical tube to be divided for forming the commutator segments by cutting it in the axial center of the deep-cut recess in the axial direction, that is, since the undercuts are cut in at portions where the wall thickness of the conductive material is extremely thin, the undercuts may be shallow. Thus, the volume of the cut in the insulating resin at undercut portions is reduced, thereby allowing the strength of the resin portions to be enhanced. Moreover, the service life of tools for undercutting can be prolonged.

(4) In particular, by forming stubborn cut-and-raised protrusions opposed to each other in proximity to the connecting claws, the commutator segments can be prevented from floating due to a high level of heat generated in wiring process.

(5) Since the manufacturing method of the present invention allows the internal claws and cut-and-raised protrusions to be molded by cylindrically bending oriented progressive dies made of plate material, the productivity can be enhanced.

Although the present invention has been fully described by way of an example with reference to the accompanying drawings, it is to be noted here that various changes and modifications will be apparent to those skilled in the art without departing from the spirit and scope of the invention as defined by the appended claims.

What is claimed is:

1. A commutator for use in a motor in which a plurality of commutator segments are fixed to an outer circumferential face of a cylindrical insulating resin, comprising:

a recess formed in an inner circumferential face of each of the commutator segments to which the cylindrical insulating resin is fixed;

first claw members formed on both circumferential sides of said recess and slanted inwardly over said recess; and protrusions formed on both axial sides of said recess and slanted over said recess.

2. The commutator as claimed in claim 1, wherein the recess is formed in a rectangular shape, and four side walls surrounding the recess are slanted inwardly such that the first claw members and the protrusions overhang the recess.

3. The commutator as claimed in claim 2, further comprising:

V-shaped grooves each partially defined by, and disposed in a circumferential direction outside of the first claw members;

second claw members each formed to slant away from the recess and disposed circumferentially outwardly of the V-shaped groove; and deep-bottomed grooves each formed circumferentially outwardly of the second claw members, said deep-bottom groove having undercuts provided thereto, whereby the commutator is separated into said plurality of commutator segments.

4. A commutator for use in a motor having a plurality of commutator segments fixed to an outer circumferential face of an insulating resin alternately with undercuts, comprising:

a recess formed in an inner circumferential face of each commutator segment to be fixed to the outer circumferential face of the insulating resin;

a center convex portion in a center of the recess;

an end convex portion on one side of the recess;

first cut-and-raised protrusions provided at both axial ends of the center convex portion so as to be slanted outwardly to overhang the recess;

second cut-and-raised protrusions provided at an inner end of the end convex portion so as to be slanted inwardly to overhang the recess; and internal claws and grooves provided on both sides in a peripheral direction of the recess and each of said internal claws and grooves extending along an entire axial length of each commutator segment, said internal claws slanted inwardly relative to said recess, and wherein the undercuts are provided in centers of the grooves.

* * * * *